Dec. 6, 1966    A. HECKER ET AL    3,289,929
TRADING-STAMP DISPENSING APPARATUS
Filed Feb. 14, 1964    9 Sheets-Sheet 1

Fig.1

Inventors:
Alfred Hecker
and
Gerhard Becker

Dec. 6, 1966    A. HECKER ETAL    3,289,929
TRADING-STAMP DISPENSING APPARATUS
Filed Feb. 14, 1964    9 Sheets-Sheet 6

Inventor:

United States Patent Office 3,289,929
Patented Dec. 6, 1966

3,289,929
TRADING-STAMP DISPENSING APPARATUS
Alfred Hecker and Gerhard Becker, Bielefeld, Germany, assignors to Anker-Werke Aktiengesellschaft, Bielefeld, Germany, a corporation of Germany
Filed Feb. 14, 1964, Ser. No. 344,986
Claims priority, application Germany, Feb. 22, 1963, A 42,397
17 Claims. (Cl. 235—7)

Our invention relates to apparatus for dispensing trading or discount stamps under control by a registering business machine, preferably a cash register.

In self-service and other retail stores, discounts on all or some kinds of merchandise being sold are often made available in the form of trading stamps which are issued by the cashier to be collected by the customer. Such trading stamps can be dispensed by devices operated by hand or controlled by a registering or computing unit of the cash register.

In some branches of retail business, it is customary to grant special discounts beyond those customarily applied, in connection with seasonal sales such as summer or winter close-out sales, or at other occasions such as a business anniversary or the like.

As a rule, the trading stamps are available to the retail stores in form of stamp-tape rolls which, for economy, are usually obtained in large numbers for issuance at the various cashiers' counters. This would make it necessary to provide for a new stock of different stamps if the amount of discount is to be changed for certain types of merchandise or during one of the above-mentioned special sales. For example, if normally a discount of 3% is granted, and within a certain period of time this discount is to be increased to 4% and possibly thereafter to 5%, it is necessary to keep three different kinds of stamp-tape rolls in stock, or to also equip the dispensing devices for issuance of stamps from a large number of different tape rolls.

It is an object of our invention to eliminate the need for thus increasing the amount of different stamp-tape rolls to be kept in stock and to also permit keeping the space requirement of the dispensing devices at a minimum.

Another, more specific object of our invention is to devise a trading-stamp dispensing apparatus that affords adapting one and the same pre-printed trade stamp to the respectively different business requirements.

It is known to impress postage stamps with value-modifying imprints for the purpose of using an available remainder of stamps in the event the postage rates are changed. This requires passing the no longer applicable sheets of postage stamps through a printing press. The sheets of postage stamps, once imprinted in this manner, become useless if it should again become necessary to change the face value of the stamps.

Also known is a railroad-ticket printing apparatus in which the ticket, while being issued, is provided with an imprint denoting the fare, the destination and other data. This is done by means of an adjustable printing mechanism mounted in the housing of the dispensing apparatus. The roll of ticket tape accommodated in the housing, is perforated into individual portions, each carrying a pre-printed impression other than those denoting the fare. The individual portions, as long as they are not provided with the additional impression produced during issuance, are of no validity or value.

It is, therefore, another, more specific object of our invention to provide a trading-stamp dispensing device that cannot only be selectively adapted to the above-mentioned changing business conditions, but that normally issues the trade stamps fully printed with the normal value-denoting data which, only if and when especially desired, are selectively modified by value increasing or decreasing markings, thus limiting the printing operation within the dispensing apparatus to those cases in which the stamps being issued are intended to depart from those normally employed.

To achieve these objects, and in accordance with a feature of our invention, we provide a trading-stamp dispensing apparatus with a selectively actuable printer which is disposed at the stamp-tape travel path between the tape-roll accommodating supply means and the outlet of the dispenser and which is printingly engageable with the stamps being issued; and we further equip the dispensing apparatus with control means for setting the printer to different value-modifying data to be imprinted upon the stamps, the printer being normally inactive so that the stamps are issued in their pre-printed form and thus generally denote the monetary or percentile value for which they are being issued, this value being modified only in such cases where the printer is placed in active condition to put the selective modifying imprint upon these stamps.

By virtue of such a dispensing apparatus, the same types of trading stamp can be issued at all times, regardless of the amount of the business transaction involved and regardless of any change in the rate of discount, so that only a minimal number of stamp-tape rolls, all of the same kind, need be kept in stock, and the dispenser need be equipped for only a minimal number of rolls.

Since, in contrast to the above-mentioned ticket printing apparatus, a stamp-dispensing device according to the invention normally issues completely finished trade stamps, the printer in the dispensing device is generally inactive and is placed in operation only in cases where the special discount is to be applied. It can be estimated, therefore, that the printer in the stamp-dispensing device according to the invention may be inactive, as a rule, in approximately 90% of all business transactions, so that neither the printing mechanism nor the appertaining inking device is subjected to appreciable wear or requires an appreciable amount of additional maintenance or attention.

According to another feature of our invention, in conjunction with those already mentioned, the feed means that pass the stamp tape from the supply roll past the printer to the dispensing outlet, are connectable to the cash register or other registering business machine so that the issuance of stamps takes place in accordance with the amount registered in the machine.

According to another, preferred feature of our invention, the just-mentioned drive control of the tape feed in the stamp-dispensing device is pre-set for operation during the machine run of a cash register for registering the transaction items upon which a discount in form of trade stamps is due, but the feed drive of the dispensing device is released for operation only by the subsequent totalizing machine run that terminates the registering operation. The control of the dispensing apparatus is preferably effected in such a manner that the trade stamps being issued from a roll of tape have all the same unit value, and the number of stamps being issued from that roll at a time corresponds to the amount registered by the machine.

According to still another feature of our invention, we provide the dispensing apparatus with a clearing device which eliminates the pre-setting of the feed drive upon issuance of stamps, thus placing the dispenser in ready condition for response to the next series of control signals from the cash register.

The above-mentioned and other objects, advantages and features of our invention, said features being set forth with particularity in the claims annexed hereto, will be apparent from, and will be mentioned in, the following description of an embodiment of apparatus according to the invention illustrated by way of example on the accompanying drawings in which:

Figure 1:
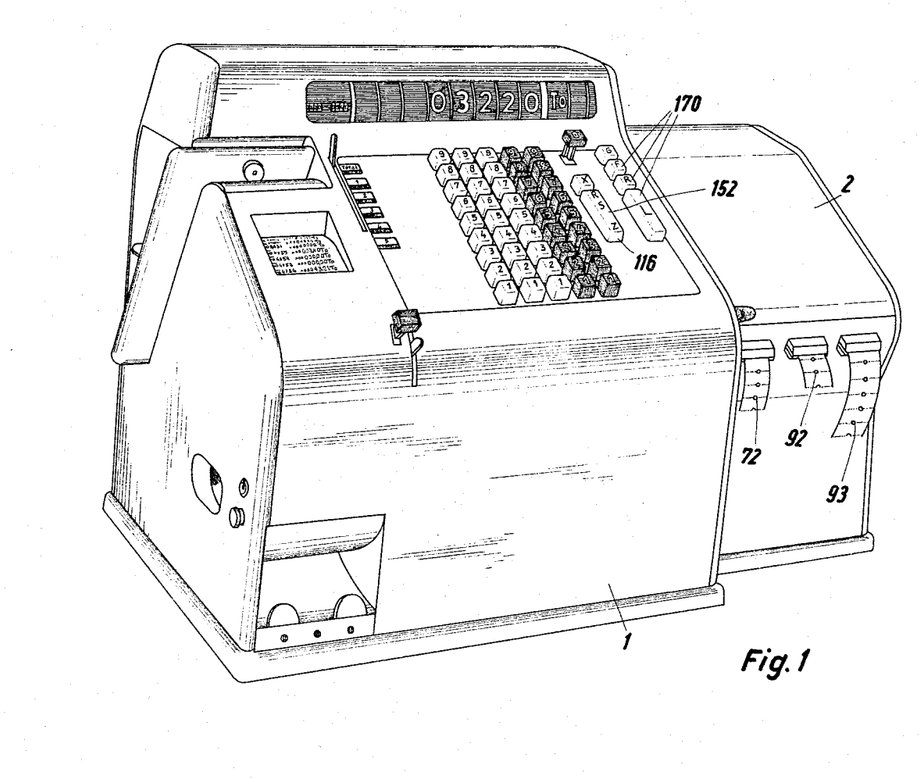
FIG. 1 is a perspective view of a trade-stamp dispensing apparatus joined with a cash register.

The cash register 1 shown in FIG. 1 is of the change-computing type known as such, for example, from U.S. Patent 3,049,288 and Reissue Patent 25,431.

The stamp-dispensing device 2 joined with the cash register is provided with an electric motor 3 (FIG. 2) which drives, through spur gears 4 and 5, a shaft 7 revolvably mounted on the machine housing 6 and carrying a single-turn clutch 9 controllable by an electromagnet 8 to impart a single full revolution to a cam shaft 10 (FIGS. 2, 5) in response to each releasing pulse applied to the magnet 8. The clutch 9 is shown only schematically because such single-turn clutches are generally known and employed in business machines. Respective spur gears (not shown) on clutch 9 and cam shaft 10 mesh with each other, so that the shaft 10, also revolvably mounted on the machine housing 6, revolves in synchronism with the clutch 9. A cam 11 on shaft 10 coacts with a roller 12 (FIGS. 2, 3) which is carried by a lifting disc 14 rigidly fastened to a bushing 13 (FIGS. 2, 3).

Figure 2:
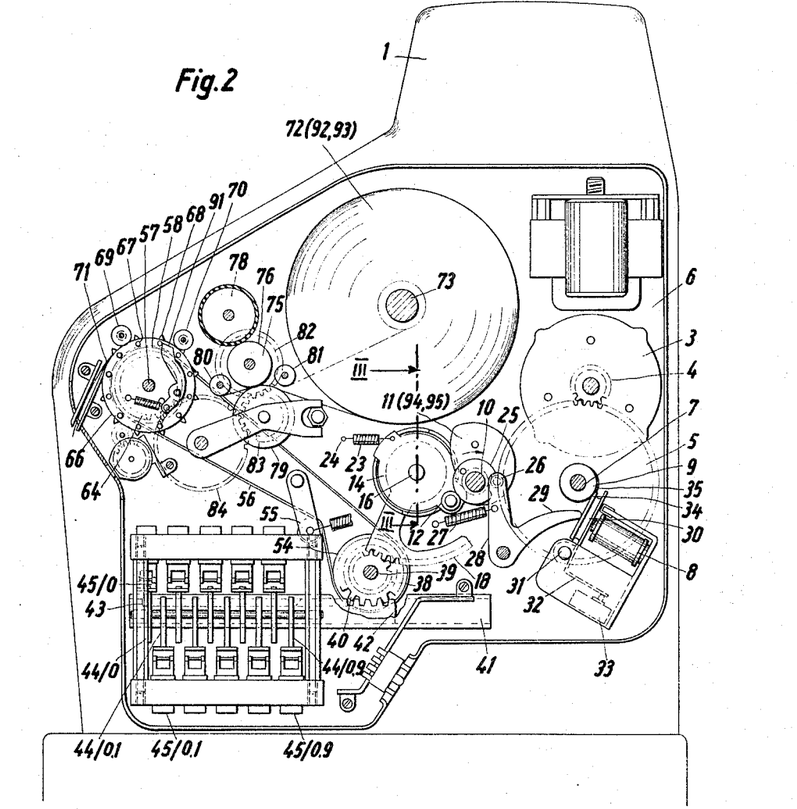
FIG. 2 is a vertical cross section through the stamp-dispensing device.
Figure 3:
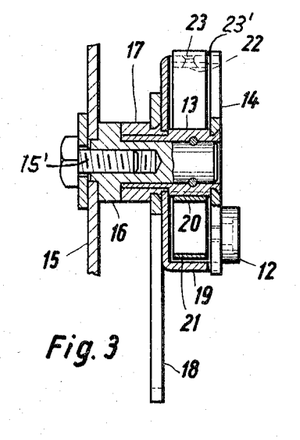
FIG. 3 shows in section a detail of the tape-feed drive in the dispenser according to FIG. 2, the section being along the line III—III in FIG. 2.

The bushing 13 is rotatably seated on a pin 16 rigidly fastened to an intermediate wall 15 of the housing by means of a screw bolt 15' (FIG. 3). The bushing 13 serves as a journal for a coaxial outer sleeve 17 to which a gear segment 18 and an entrainer 19 designed as a spring housing, are rigidly attached by a clamping pressure fit. A pre-stressed spiral spring 21 has one end in engagement with a groove 20 of bushing 13. The other, outer end 22 of spring 21 is attached to a pin 23' fastened to the entrainer 19. A helical pull spring 23 (FIG. 2) is mounted opposite the roller 12 and acts between the lifting disc 14 and a fixed pin 24 to impose upon disc 14 a biasing force in the counterclockwise (FIG. 2) direction.

Rigidly seated on the cam shaft 10 is a cam 25 (FIG. 2) which is engaged by a roller 26 of a follower 28 shaped as a bell-crank lever and biased by a pull spring 27. One arm 29 of lever 28 rests against the armature 30 of the clutch-control magnet 8 when the armature 30 is in the dropped-off position shown in FIG. 2. The spring-loaded armature 30 is pivoted on a pin 31 and has an arm 32 acting upon a contact switch 33. In the starting position shown in FIG. 2, a nose 34 of armature 30 abuts against a stop cam 35 of the single-turn clutch 9. When the armature 30 is attracted, cam 35 is released so that the clutch 9 is entrained by the shaft 7 and, upon rotating 360°, is again arrested by the nose of armature 30 abutting against the stop cam 35.

Figure 4:
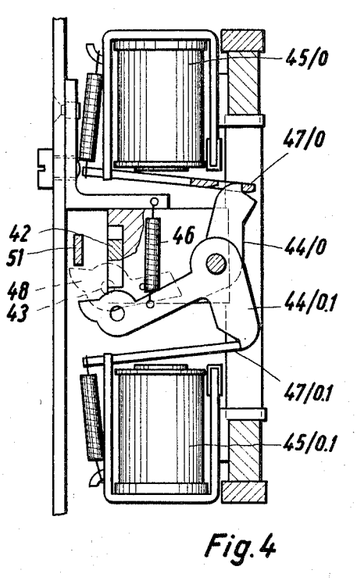
FIG. 4 is a partly sectional view of switching magnets that control the tape feed in the dispenser, the same magnets being also visible in the left lower portion of FIG. 2.
Figure 5:
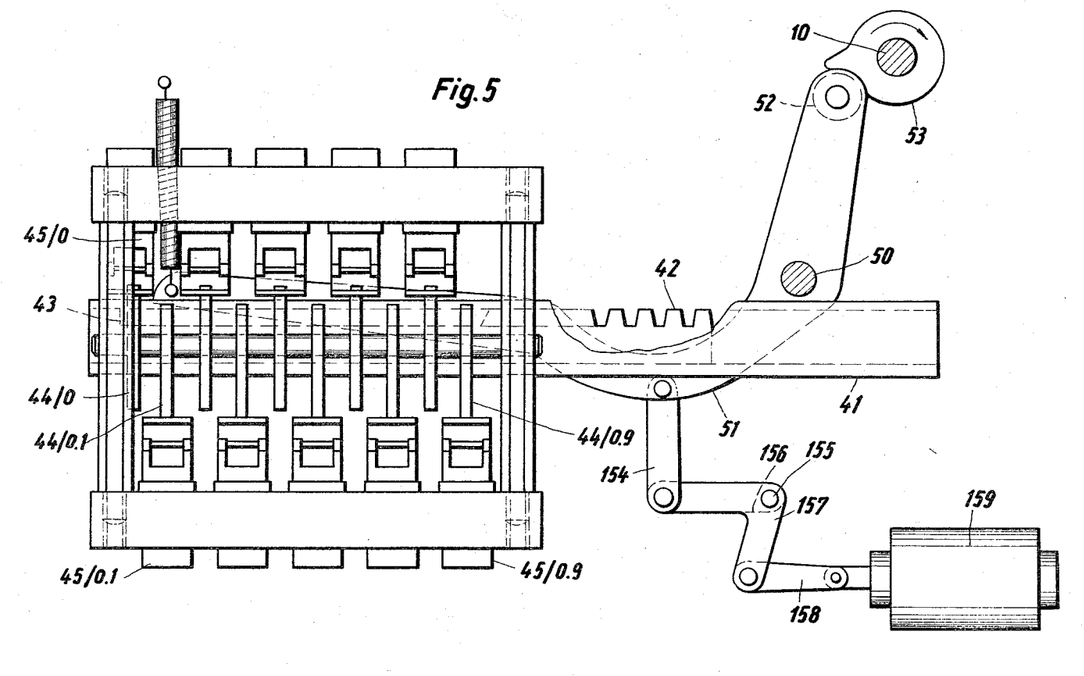
FIG. 5 shows the same switching magnets by a lateral view and in conjunction with other components.

The gear segment 18 (FIGS. 2, 3) meshes with a pinion 38 fastened on a shaft 39 which carries a spur gear 40 meshing with a rack 42 (FIGS. 2, 5). Rack 42 glides in a guide 41. A stop 43 at the left end of rack 42 cooperates with stop pawls 44/0, 44/0.1 to 44/0.9 (FIGS. 4, 5) at respective control magents 45/0, 45/0.1 to 45/0.9. The pawls are biased by respective pull springs 46 (FIG. 4) and are kept in the starting position according to FIG. 4 by means of the spring-loaded armatures 47/0, 47/0.1 to 47/0.9 of respective control magnets 45/0, 45/0.1 to 45/0.9. When one of the control magnets 45/0, 45/0.1 to 45/0.9 is energized, the appertaining one armature is attracted and releases its pawl 44/0, 44/0.1 to 44/0.9. The spring 46 now snaps the pawl to the active stop position shown by broken lines in FIG. 4. As a result, when the rack 42 is being driven by the gear segment 18, the rack can advance only until it is arrested at its stop 43 by the pawl. The stop pawls 44/0, 44/0.1 to 44/0.9 (FIG. 5) are controlled by a lever 51 pivoted on a fixed pin 50 and carrying a follower roller 52 coacting with a cam 53 on the cam shaft 10. The cam 53 serves to return the pawls 44/0, 44/0.1 to 44/0.9 from the active-stop (broken-line) position to the inactive starting position according to FIG. 4, shortly before the cam shaft 10 terminates its single revolution.

Figure 6:
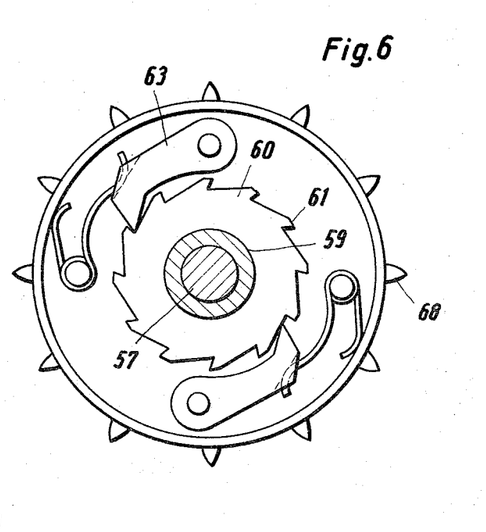
FIG. 6 is a lateral view of a tape-transport sprocket assembly, and FIG. 7 a part sectional front view of the same assembly.
Figure 7:
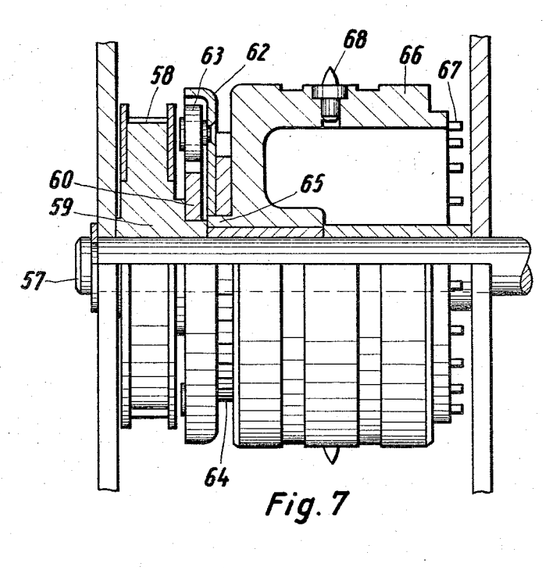

Further fastened on the shaft 39 (FIG. 2) is a toothed belt sheave 54 which meshes with a likewise toothed endless drive belt 56. The belt is kept taut by a spring-loaded roller 55 and trained about a driven belt sheave 58 on a shaft 57 (FIGS. 2, 6, 7). Fastened to the hub of the belt sheave 58 is a ratchet gear 60 (FIGS. 6, 7) whose saw teeth are engaged by spring-biased transport pawls 63 pivoted on a pan-shaped disc 62. The disc 62 is rigidly seated, together with a spur gear 64, on the hub 65 of a sprocket roller 66 which is likewise journalled on the shaft 57. Press-fitted into a plannar front face of the sprocket roller 66 are a number of peripherally distributed stop pins 67. Sprocket pins 68 are press-fitted into the peripheral surface portion of the roller, likewise in uniform peripheral distribution for the purpose of entering into the perforations of the stamp-tape 72 (FIGS. 2, 1) coming from a tape-supplying roll 73 (FIG. 2). The tape is pressed against the peripheral surface of the sprocket roller 66 by spring-biased pressure rollers 69 and 70.

Figure 8:
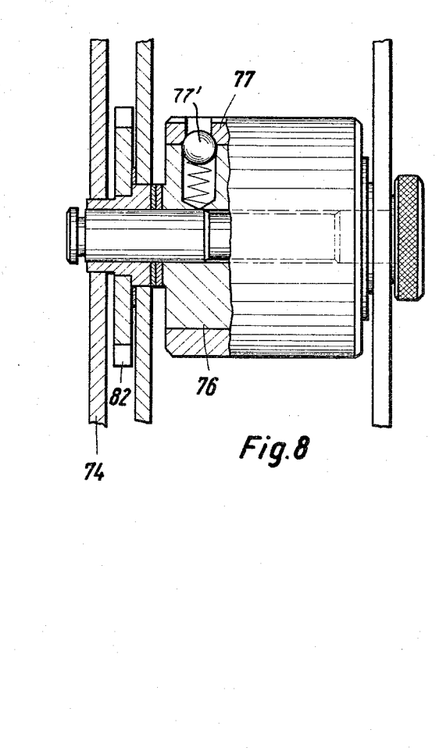
FIG. 8 is a front view of a cliché printing roller, partly in section.
Figure 9:
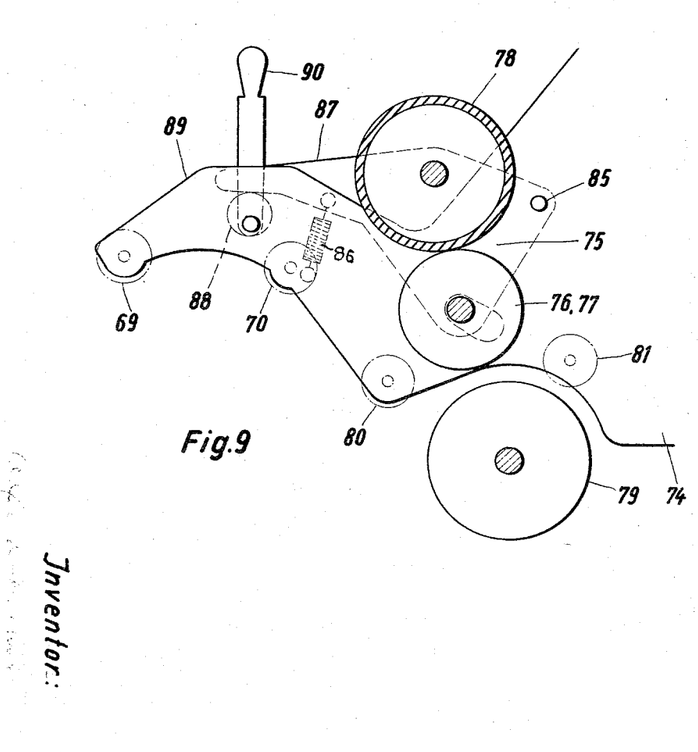
FIG. 9 is a lateral view of the printer mechanism.

The tape roll is rotatably seated on a shaft 73 (FIG. 3) that is mounted (not shown) in a stamp housing 74 which can be swung out of the larger dispenser housing and is separately illustrated in part by FIGS. 8 and 9. The roller 72 is engaged by a brake (not illustrated) in the conventional manner to apply some amount of drag to the tape being unwound and thereby prevents the roller from becoming unwound excessively.

Mounted on the stamp housing 74 between the sprocket roller 66 and the roll of stamp tape 72 is a printing mechanism 75 (FIGS. 8, 9), so that this mechanism, together with the housing 74, can be swung out of the normal position. The printer mechanism comprises a cliché roller 76 (FIG. 8) containing a readily exchangeable cliché 77 which is prevented from axial displacement by a spring-loaded stop ball 77'. The printer is further equipped with an inking roller 78 (FIG. 9) covered with felt or other absorbent material, and with a feed roller 79 and pressure rollers 80 and 81. The cliché roller 76 and the feed roller 79 are connected by spur gears 82, 83, 84 with the spur gear 64 of the sprocket roller 66 (FIG. 2). The peripheral speeds of feed roller 79 and chiché roller 76, engageable with the stamp tape 71, are equal.

The cliché roller 76 (FIG. 9) as well as the inking roller 78, equipped with an ink dosing device (not shown) of conventional kind, are journalled on a frame structure 87. This frame structure is pivotally mounted on a pin 85 and biased by a pull spring 86. By means of an eccentric 88 the frame structure with the printing mechanism can be swung into and out of the active position, thus placing the cliché 77 into or out of the printing position. The eccentric 88 is journalled on the frame structure 89 and manually adjustable by means of a hand lever 90. A spring-biased detent 91 pivotally mounted on the stamp housing 74 (FIG. 2) is engageable with the stop pins 67 (FIGS. 2, 7) of the sprocket roller 66 to prevent reverse rotation of the sprocket roller.

Reverting to FIG. 1, it will be seen that the illustrated stamp dispenser 2 is designed for issuance of three different stamps. The components described thus far relate, for example, to a roll of stamp tape for the issuance of stamps corresponding to values of $0.1 to 0.9. These stamps are shown at 72 in FIG. 1. The two other rolls of stamp tape 92 and 93 (FIG. 1) for issuance of stamps corresponding to the value ranges of $1.0 to 9.0 and $10.0 to 90.0 are designed in the same manner as described above with reference to the components relating to the issuance of the stamps 72. The respective assemblies of components are located side by side in the housing of the dispenser apparatus, and the feed of the respective three stamp tapes is effected under control by cams 94 and 95 respectively which are mounted on the same cam shaft 10 (FIG. 2) and act upon control and drive components corresponding exactly to those already described.

The individual printer mechanisms 75 for each roller of stamp tape 72, 92, 93 can be selectively set to active positions by means of the respective hand levers 90 (FIG. 9). If desired, however, a common shaft 96 (FIG. 10) can be provided for jointly switching all of the printing mechanisms 75 to on and off positions. The shaft 96 carries three control cams 97, 98, 99 and can be turned between on and off positions by means of a conventional switch lock using the appertaining latch key 101.

Figure 11:
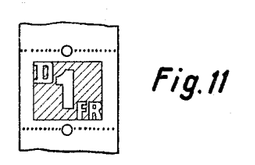
FIGS. 11, 12 and 13 exemplify trade stamps as may be issued by the dispenser.

The printing mechanism 75 offers the possibility of using the stamp-dispensing apparatus 2 selectively for:

(1) Issuing pre-printed trade stamps as exemplified by FIG. 11. As mentioned, this may constitute the major use under normal business conditions.

Figure 12:
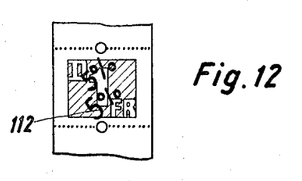

(2) Providing pre-printed stamps during issuance with a value-modifying impression, as exemplified by an added percentile marking in FIG. 12.

Figure 13:
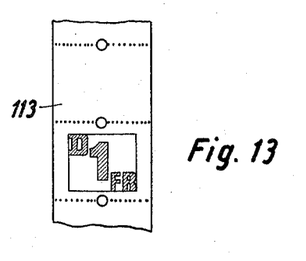

(3) Using blank perforated tapes of paper 113 and imprinting them during issuance in any desired manner, for example as shown in FIG. 13.

Due to the fact that the cliché 77 is exchangeable, the type of markings to be added to the stamps can readily be adapted to any occurring business conditions.

The electric control equipment of the above-described stamp-dispensing apparatus will now be explained with reference to FIG. 14.

The positive current-supply bus 110 of the cash register 1 is connected by a lead 111 to a contact switch 112 controlled by a cam 114 fastened on the machine main shaft 121 of the cash register 1. The switch 112 is connected by a lead 115 with the movable contact arm of a selector switch 117 coordinated to the mode-of-operation control key bank 116 (FIG. 1) of the change-computing cash register 1. This cash register may correspond to those according to the above-mentioned patents or the one shown and described in the application Serial No. 169,761, filed January 30, 1962, of G. Becker, assigned to the assignee of the present invention. The shaft of the selector switch 117 may be mechanically or electrically connected to, or controlled by, the key bank 116, such as in dependence upon the movement of the appertaining differential mechanism. The bank contacts of selector switch 117 comprise, among others, a contact 118 for totalizing operation and a contact 119 for change computation. A manifold connection leads from contact 118 to the respective contact arms of three further selector switches 113, 122, 123 for the $0.1 series, the $1.00 series and the $10.00 series respectively. These selector switches 113, 122, 123 are set under control by the differential mechanisms of the corresponding amount-key banks under control by the appertaining adding mechanisms in the known manner. The bank contacts 124 (0.0 to 0.90) in selector 113 are connected by individual leads 127 with the above-described control magnets 45/0.00 to 45/0.90, respectively (FIGS. 4, 14). The bank contacts 125 (0.00 to 0.90) in selector 122 (FIG. 14) are analogously connected with respective control magnets 128 (0.00 to 9.00); and the bank contacts 126 (0.00 to 9.00) of selector 123 are connected in the same manner with respective control magnets 129 (00.00 to 90.00). The respective other poles of the control magnets in all three groups are connected to the negative main bus 130 of the cash register through leads 131 and 132.

The motor 3 (FIGS. 2, 14) is connected at its terminals 134, 135 between the negative main bus 130 of the cash register and the bank contact 119 in the operation-control selector 117 through leads 133 and 136. While a direct connection of selector 117 with motor 3 is shown in FIG. 14, it will be understood that the conventional relay or contactor devices may be interposed. Lead 133 is also connected through a branch lead 137 with a time delay relay 138 whose negative pole is connected through leads 139, 140 to the negative bus 130. Lead 137 is also connected at 141 through a normally open contact 142 of relay 138 and a lead 143 with the control magnet 8 (FIG. 2) of the single-turn clutch 9 (FIGS. 14, 2). A lead 144 connects the magnet 8 with the negative lead 136.

Figure 14:
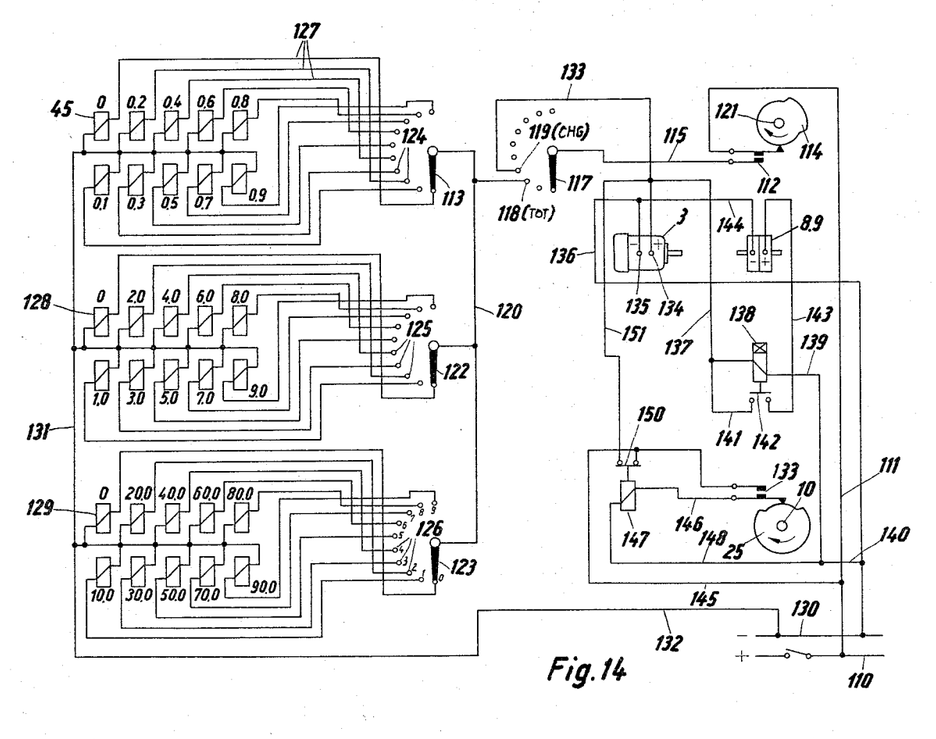
FIG. 14 is an electric circuit diagram of the stamp-dispensing apparatus.

A self-holding circuit extends from the positive bus 110 through leads 111, 145 to a contact 133 controlled by the cam 25 on cam shaft 10 (FIGS. 14, 2). From contact 133 the circuit extends through a lead 146 to a control relay 147 which is connected through leads 148, 140 and 136 with the negative bus 130 (FIG. 14). The control relay 147 has normally closed contacts 150 connected between the positive lead 145 and through a lead 151 to the lead 133.

The control magnets correlated to the positions 0.9 and 9.0 and 90.0, as well as the respective stop pawls of these magnets, can be substituted by respective fixed stops, if desired.

The operation of the equipment described so far shall be explained with reference to a sales transaction involving a purchase by the customer in the amount of $24.80 subject to discount by issuance of trade stamps.

As mentioned, the cash register 1 (FIG. 1) is of the type that permits computing the amount of change that may be due to the customer. After the cashier has successively entered the individual sales items, he totalizes the amount of $24.80 by actuating the control key 152 on the keyboard of the machine. When the totalizing run of the cash register commences, the selector 117 (FIG. 14) is set to bank contact 118 by virtue of the machine operation, whereafter the sum is drawn from the computing (adding) mechanism (not shown) of the cash register 1. Simultaneously, the machine causes the selectors 113, 122, and 123 to be adjusted to the respective bank contacts 124/8, 125/4 and 126/2. These bank contacts correspond to the totalized sum drawn from the computing mechanism. In the further course of the machine run, the contact pair 112 controlled by the cam 114 closes the energizing circuits for the control magnets 45/0.80, 128/0.00 and 129/20.00. The armatures 47 of these three magnets are attracted and release the appertaining stop pawls 44 (FIG. 4). This determines the travel path for the respective three racks 42 (FIG. 2). Prior to termination of the machine run, whose performance is in the mode "sub-totalizing," the energizing circuit for the just-mentioned three control magnets are again opened by the respective cam contacts 112.

The customer now tenders an amount which may be in excess of the one due. The tendered amount is posted into the amount keyboard of the machine, and another machine run is then released by the cashier depressing the same control key 152. The now ensuing machine run is in the mode "addition." Thereafter, the cashier initiates a further machine run in the mode "final total" for the purpose of determining the amount of change to be returned to the customer. During the latter machine run, the selector 117 is advanced to bank contact 119 (FIG. 14). Now the cam contact 112 closes the energizing circuit for motor 3. After the motor commences running, the time-delay relay 138 closes the circuit of the magnet 8 for the single-turn clutch 9. The cam shaft 10 is now operated for a single rotation. The lifting discs 14 are turned clockwise by the respective cams 11, 94 and 95 (FIG. 2); and the spiral springs 21 connected with the respective lifting discs 14 turn the gear segments 18 in the same sense of rotation until the respective racks 42 are stopped by abutting against the respective pawls 44/0.80, 44/4.00 and 44/20.00. The overrunning travel of the lifting discs 14 is absorbed by the spiral springs 21.

While the gear segments 18 are rotating clockwise, they simultaneously rotate each of the sprocket rollers 66 through operation of the sheave 54, belt 56, sheave 58 and transport pawls 63. The rotary motion thus imparted to each sprocket roller 66 proceeds a number of steps determined by the appertaining, then active stop pawl 44. As a result, the three tape rolls 72, 92 and 93 are caused to issue, respectively, eight stamps of $0.1 denomination, four stamps of $1.00 denomination, and two stamps of $10.00 denomination. If desired, and provided the printing mechanism is correspondingly set, each individual stamp now being issued can be marked by the printing mechanism 75 during the feed travel of the tape, so as to exhibit a value-modifying overprint. The synchronous rotation of the cliché roller 77 (FIG. 8) relative to the sprocket roller 66 is secured by the above-described spur gear transmissions 64, 82, 83 and 84.

In order to have the stamp-dispensing operation proceed independently, with respect to time, of the machine run that initiates the dispensing operation, the cam shaft 10 (FIGS. 2, 14), when commencing its single-turn rotation, causes its cam 25 to close the holding circuit 110–145–133–146–147–148–140–130, which energizes the control relay 147. Contact 150 of control relay 147 now also closes the energizing circuit 110–145–150–151–134–135–133–136–130 for the electric motor 3. The time relay 138 is energized in parallel relation to motor 3 and closes its contact 142 to maintain the circuits of motor 3 and clutch magnet 8. The subsequent opening of contact 112, controlled by the machine main shaft 121 of the cash register, interrupts the initially closed motor circuit 110–111–112–115–117–119–133–134–135–136–130. This, however, does not affect the operation of the stamp-dispensing apparatus 2.

After several sales items have been registered and the sum has been determined by a sub-totalizing run of the cash register, it may happen that the customer wishes to add purchases of merchandise to those previously registered. Any such additional items, assuming that they are likewise due to a discount in form of trade stamps, must then be posted into the cash register 1. However, the selected stop pawls 44 are now transferred to their respective active positions, due to the fact that the sub-totalizing machine run has already occurred. It is necessary, therefore, to return the stop pawls 44 to the starting position shown in FIG. 4.

For this purpose, a reset lever 154 (FIG. 5) is linked to each control lever 51. The lever 154, in turn, is linked to a bell-crank lever 157 articulately joined by a link 158 with the armature or core of a clearing magnet 159 in form of a solenoid. The bell-crank lever 157 is rigidly fastened to its pivot shaft 155 which is revolvably mounted and carries additional levers 156 similarly linked with the respective other control levers 51. When the clearing magnet 159 is energized, it rotates all of the control levers 51 counterclockwise and thereby returns the switch pawls 44 to the starting position.

Figure 15:
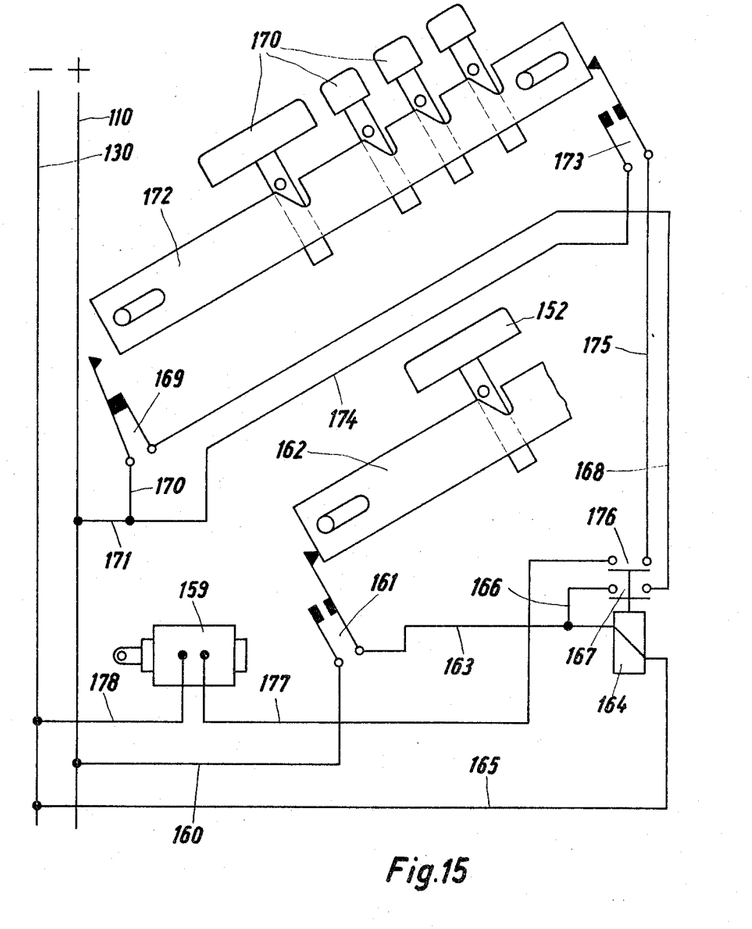
FIG. 15 is another circuit diagram showing the electric connections of a dispenser clearing magnet with the control keys of the cash register.

The clearing magnet 159 is controlled by the devices described presently with reference to FIG. 15.

The above-mentioned positive bus 110 is connected by a lead 160 with a normally open switch 161 is closed by movement of a keyboard slider 162 controllable by means of a push-button key 152 (FIGS. 15, 1). The switch 161 is connected by a lead 163 with a control relay 164 from which a lead 165 extends to the negative bus 130. Lead 163 is also connected through a normally open self-holding contact 167 of a relay 164 and through a lead 168 with a normally closed switch 169 which is connected through leads 170 and 171 with the positive bus 110. The switch 169 in the self-holding circuit cooperates with a key slider 172 in the bank of the adding mechanism selector keys 170 (FIGS. 15, 1) of the cash register. The key slider 172, when being actuated, opens the switch 169 after closing a normally open switch 173. Switch 173 is connected by leads 174, 175, 177, 178 between buses 110 and 130 in series with the normally open main contact 176 of relay 164 and in series with the clearing magnet 159.

The control system for the clearing magnet 159 operates as follows.

When the control key 152 of the cash register is being actuated, the displacement of the appertaining key slider 162 closes the switch 161. This supplies voltage to the control relay 164 which closes its contacts 167 and 176. Contact 167 completes a self-holding circuit which maintains the control relay 164 energized when thereafter the machine key 152, upon termination of the totalizing (sum-forming) machine run, is released and returns to its starting position. As soon as the cashier actuates any one of the adding-mechanism selector keys 170 for the purpose of entering the amount of a further sales item, the key slider 172 first closes the switch 173. This switch completes the energizing circuit for the clearing magnet 159 which now rotates the control lever 51 (FIG. 4) and thereby returns the previously released stop pawls 44 to the starting position. Shortly before the key slider 172 reaches the end of its gliding movement caused by depressing a selector key 170, the switch 169 opens and interrupts the self-holding circuit of control relay 164. The relay drops off and opens its contacts 167 and 175, thus de-energizing the clearing magnet 159.

Figures 10, 16:
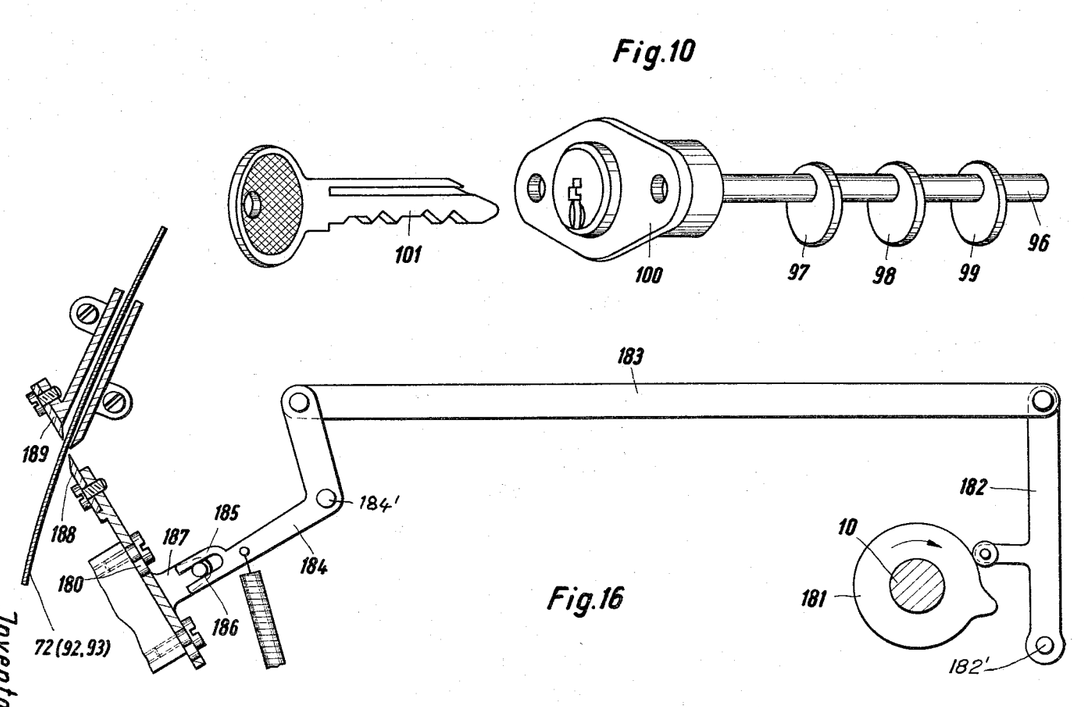
FIG. 10 shows in perspective a control device for the printer mechanism.
FIG. 16 shows a cutter device for the stamp tape.

For automatically severing the issued trade stamps from the respective rows of tape 72, 92 and 93, the dispensing apparatus is provided with a single cutting device 180 driven from the cam shaft 10 by means of a cam 181 (FIG. 16). The cam 181 acts upon a roller journalled on a follower 182 which is pivoted at 182' and joined by a link 183 with a spring-biased bell-crank lever 184 pivoted at 184'. The lever 184 has a bifurcated arm 185 which straddles a pin 186 on a displaceable blade carrier 187. A blade 188 mounted on the carrier cooperates with a fixed counter blade 189. The cam 181 has its lobe so set that the cutting movement of the blade 188 takes place after the stamp tapes have completed their feeding travel, so that the correct number of individual stamp units is severed from each of the three stamp tapes for issuance to the customer.

In lieu of the cliché 77 according to FIG. 8, which is designed for providing only one given marking, for example 5% (as exemplified in FIG. 12), the cliché roller may also be provided with a displaceable cliché that can be secured in a selected position and carries several markings, for example 4% and 5% side by side. Then any one of these markings can be selectively printed upon the stamps, depending upon the chosen displacement of the cliché relative to the supporting roller. In this manner, one and the same printing device can be readily employed for producing respectively different imprints upon the stamp being issued.

To those skilled in the art, it will be obivous upon a study of this disclosure, that our invention permits of a great variety of modifications and can be given embodiments other than particularly illustrated and described herein, without departing from the essential features of our invention and within the scope of the claims annexed hereto.

We claim:

1. A trading-stamp dispensing apparatus, comprising stamp-tape supply means, stamp outlet means, feed means defining a tape travel path from said supply means to said outlet means, said feed means having tape drive means for positively advancing the tape and drive control means connectable to a registering business machine for controlling said feed means to issue a number of stamps varying in accordance with an amount registered by said machine, a printing device having means for imprinting a value-modifying overprint onto the stamps being issued, said printing device being disposed at said travel path and having means for selectively setting said device to active and inactive conditions independently of the advancement of the tape by said tape drive means, and drive motor means for operating said tape drive means and said stamp imprinting means in synchronism.

2. In a trading-stamp dispensing apparatus according to claim 1, said printer device comprising an exchangeable cliché for producing said overprint, said cliché being mounted on a roller and being removable therefrom without removing said roller.

3. In a trading-stamp dispensing apparatus according to claim 1, said printer device comprising a roller engageable with the stamp tape, an exchangeable cliché of annular shape coaxially seated on said roller, and a spring-biased latch mounted in said roller and engageable with said cliché for preventing inadvertent axial displacement thereof, said cliché being removable without removing said roller.

4. A trading-stamp dispensing apparatus, comprising stamp-tape supply means, stamp outlet means, feed means defining a tape travel path from said supply means to said outlet means, said feed means having tape driven means for positively advancing the tape and drive control means connectable to a registering business machine for controlling said feed means to issue a number of stamps varying in accordance with an amount registered by said machine, a printing device having means for imprinting a value-modifying overprint onto the stamps being issued, said printing device being disposed at said travel path, said device having selective control means for rendering it active and inactive independently of the advancement of the tape by said tape drive means, means for adjusting said printer device to respectively different value-modifying data imprintable upon said stamps, and drive motor means for operating said tape drive means and said stamp imprinting means in synchronism.

5. A trading-stamp dispensing apparatus, comprising a plurality of stamp-tape supply means and respective outlets for stamps of respectively different value denominations, respective feed means defining a tape travel path from each of said supply means to the one appertaining outlet, each of said feed means having tape drive means for positively advancing the tape and drive control means connectable to a registering business machine for controlling said feed means to issue a number of stamps varying in accordance with an amount registered by said machine, a plurality of printing devices disposed at said respective tape travel paths and having cliché means for imprinting a value-modifying overprint upon the stamps being issued, said printing devices having selective control means for placing them in active and inactive conditions respectively independently of the advancement of the tape by said tape drive means, and drive motor means for operating said tape drive means and said cliché means in synchronism.

6. In a trading-stamp dispensing apparatus according to claim 5, each of said printing devices having manual setting means for selectively setting said individual printing devices between active and inactive conditions.

7. A trading-stamp dispensing apparatus according to claim 5, comprising a switching device (97–100) common to said plurality of printing devices for jointly switching them on and off.

8. A trading-stamp dispensing apparatus, comprising a plurality of stamp-tape supply means and respective outlets for stamps of respectively different value denominations, respective feed means defining a tape travel path from each of said supply means to the one appertaining outlet, each of said feed means having tape drive means and drive control means connectable to a registering business machine for controlling said feed means to issue a number of stamps varying in accordance with an amount registered by said machine, a single main drive member (10) having a plurality of cams (11, 94, 95) for actuating said respective tape drive means, each of said tape drive means having a rotatable gear segment (18) and a cam follower (12) riding on one of said respective cams to be displaced thereby, spring means yieldingly connecting said follower with said segment for rotating said segment by movement of said follower, and a number of stops for stopping said gear segment and thereby said feed drive at respectively different points of travel, control means for connecting said stops to said machine to control the tape travel in accordance with the registered amount, and a plurality of printing devices disposed at said respective tape travel paths and having cliché means for imprinting a value-modifying overprint upon the stamps being issued, said printing devices having selective control means for placing them in active and inactive conditions respectively.

9. A trading-stamp dispensing apparatus, comprising stamp-tape supply means, stamp outlet means, feed means defining a tape travel path from said supply means to said outlet means, said feed means having tape drive means for positively advancing the tape and drive control means connectable to a registering business machine for controlling said feed means to issue a number of stamps varying in accordance with an amount registered by said machine, a printing device having means for imprinting a value-modifying overprint onto the stamps being issued, a support structure on which said printing device is mounted, said support structure being pivotally movable between active printing position and inactive position independently of the advancement of the tape by said tape drive means, control means on said structure for selectively setting it to one of said positions, and drive motor means for operating said tape drive means and said stamp imprinting means in synchronism.

10. With a cash register, in combination, a trading-stamp dispensing apparatus comprising a plurality of stamp-tape supply means and respective outlet means for stamps of respectively different value denominations, respective feed means defining a tape travel path from each of said supply means to the one appertaining outlet means, each of said feed means having tape drive means for positively advancing the tape and drive control means; a plurality of printing devices disposed at said respective tape travel paths and having means for imprinting a value-modifying overprint upon the stamps being issued, said printing device having selective control means for placing it in active and inactive conditions respectively; a main drive common to said feed drives for jointly actuating them to feed said tapes when said individual feed drives are free to follow said main drive; said main drive comprising drive motor means for operating said tape drive means and said stamp imprinting means in synchronism; said drive control means comprising a number of stop means for selectively blocking each of said feed drives at different travel path points, said cash register having amount registering means, pre-setting control means connecting said stop means with said registering means for selectively presetting said stop means in accordance with the tape feed that corresponds to the registered amount; said cash register having a control key for releasing a totalizing run, and release control means controllable by said control key for releasing said main drive to actuate said feed drives in response to release of the totalizing run, whereby said feed drives cause stamps to be dispensed in accordance with the amount-responsive pre-setting of said stop means.

11. With a cash register, in combination, a trading stamp dispensing apparatus comprising a plurality of stamp-tape supply means and respective outlet means for stamps of respectively different value denominations, respective feed means defining a tape travel path from each of said supply means to the one appertaining outlet means, each of said feed means having tape drive means for positively advancing the tape and drive control means; a main drive common to said feed drives for jointly actuating them to feed said tapes when said individual feed drives are free to follow said main drive; said main drive comprising drive motor means for operating said tape drive means and said stamp imprinting means in synchronism; said drive control means comprising a number of stop means for selectively blocking each of said feed drives at different travel points, said cash register having amount registering means, pre-setting control means connecting said stop means with said registering means for selectively pre-setting said stop means in accordance with the tape feed that corresponds to the registered amount; said cash register having a control key for releasing a totalizing run, and release control means controllable by said control key for releasing said main drive to actuate said feed drives in response to release of the totalizing run, whereby said feed drives cause stamps to be dispensed in accordance with the amount-responsive pre-setting of said stop means.

12. In apparatus according to claim 11, said cash register having selective operation control keys comprising a subtotalizer key, and said pre-setting control means connecting said stop means with said substotalizer key, whereby said stop means are pre-set when sales items are added during the sub-totalizing run for determining the sum of the amounts registered, and said feed drives are actuated when the final machine run is released.

13. With a cash register, in combination, a trading stamp dispensing apparatus comprising a plurality of stamp-tape supply means and respective outlet means for stamps of respectively different value denominations, respective feed means defining a tape travel path from each of said supply means to the one appertaining outlet means, each of said feed means having tape drive means and drive control means; a main drive common to said feed drives for jointly actuating them to feed said tapes when said individual feed drives are free to follow said main drive; said drive control means comprising a number of stop means for selectively blocking each of said feed drives at different travel points, said cash register having amount registering means, pre-setting control means connecting said stop means with said registering means for selectively pre-setting said stop means in accordance with the tape feed that corresponds to the registered amount; said cash register having a control key for releasing a totalizing run, and release control means controllable by said control key for releasing said main drive to actuate said feed drives in response to release of the totalizing run, whereby said feed drives cause stamps to be dispensed in accordance with the amount-responsive presetting of said stop means, said stop means for each feed drive comprising a group of electromagnets and respective stop pawls operable by said magnets, and electric selector circuit means connecting said magnets with said registering means for selectively actuating a selected one of said pawls, whereby the number of stamps being issued is set in accordance with the registered amount, said main drive comprising an electric drive motor, an electrically actuable clutch between said motor and said feed drives, said motor and said clutch having respective energizing circuits, switch means connected in said energizing circuits and controllable in dependence upon operation of said main drive for causing said motor and clutch to commence driving said feed drives upon initiation of said totalizing machine run, and self-holding means connected with said energizing circuits for thereafter maintaining said dispensing apparatus in operation independently of the machine run until termination of the stamp issuing performance.

14. With a cash register, in combination, a trading stamp dispensing apparatus comprising a plurality of stamp-tape supply means and respective outlet means for stamps of respectively different value denominations, respective feed means defining a tape travel path from each of said supply means to the one appertaining outlet means, each of said feed means having tape drive means and drive control means; a main drive common to said feed drives for jointly actuating them to feed said tapes when said individual feed drives are free to follow said main drive; said drive control means comprising a number of stop means for electively blocking each of said feed drives at different travel points, said cash register having amount registering means, pre-setting control means connecting said stop means with said registering means for selectively pre-setting said stop means in accordance with the tape feed that corresponds to the registered amount; said cash register having a control key for releasing a totalizing run, and release control means controllable by said control key for releasing said main drive to actuate said feed drives in response to release of the totalizing run, whereby said feed drives cause stamps to be dispensed in accordance with the amount-responsive pre-setting of said stop means, a clearing device (51, 159) operatively connected with said stop means for re-setting the respective pre-set stop means to inactive positions, and said cash register having selector key-responsive control means (FIG. 15) connected with said clearing device controlling it to reset said stop means.

15. In apparatus according to claim 14, said clearing device comprising a normally inactive electromagnet having an energizing circuit, said key-responsive control means comprising a normally open control contact (173) in said circuit, and said cash register having key-controlled adding-mechanism selector means (170), and means connecting said selector means with said switch for closing it in response to selection of an adding mechanism.

16. In apparatus according to claim 15, said energizing circuit for said electromagnet of said clearing device comprising control means responsive to release of said totalizing run by said control key of said cash register, whereby the resetting of said stop means is also dependent upon prior release of a totalizing run.

17. In apparatus according to claim 15, said energizing circuit for said electromagnet of said clearing device comprising another normally open control contact, a self-holding relay of which said latter contact forms part and which has a coil circuit and a normally open holding contact, switch means connected in said coil circuit and responsive to release of said totalizing run by said control key of said cash register for then closing said coil circuit, a normally closed switch contact connected in said holding circuit and responsive to said adding-mechanism selector means for opening said holding circuit to thereby cause said magnet to be deenergized.

References Cited by the Examiner

UNITED STATES PATENTS

| | | | |
|---|---|---|---|
| 1,231,932 | 7/1917 | Olsen | 101—247 |
| 2,018,560 | 10/1935 | Levane | 101—212 |
| 2,264,647 | 12/1941 | Stearns. | |
| 2,368,526 | 1/1945 | Deutsch | 235—3 |
| 2,822,752 | 2/1958 | Bradshaw | 235—61 |
| 3,006,538 | 10/1961 | Deutsch. | |
| 3,009,633 | 11/1961 | Dilks | 235—61 |
| 3,077,299 | 2/1963 | Clark | 235—7 |

FOREIGN PATENTS

| | | |
|---|---|---|
| 337,917 | 12/1930 | Great Britain. |
| 547,565 | 9/1942 | Great Britain. |

RICHARD B. WILKINSON, *Primary Examiner.*

LEO SMILOW, *Examiner.*

TERRY J. ANDERSON, *Assistant Examiner.*